US012654262B2

(12) United States Patent　　　　　(10) Patent No.:　US 12,654,262 B2
Charlas et al.　　　　　　　　　　　　(45) Date of Patent:　Jun. 16, 2026

(54) METHOD FOR REPAIRING A PART FOR AN AIRCRAFT TURBINE ENGINE

(71) Applicant: SAFRAN AIRCRAFT ENGINES, Paris (FR)

(72) Inventors: Mathieu Julien Charlas, Moissy-Cramayel (FR); Adrien Francis Paixao, Moissy-Cramayel (FR); Simon Talibart, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 127 days.

(21) Appl. No.: 18/250,345

(22) PCT Filed: Oct. 25, 2021

(86) PCT No.: PCT/FR2021/051873
§ 371 (c)(1),
(2) Date: Apr. 24, 2023

(87) PCT Pub. No.: WO2022/090660
PCT Pub. Date: May 5, 2022

(65) Prior Publication Data
US 2023/0398646 A1　　Dec. 14, 2023

(30) Foreign Application Priority Data
Oct. 28, 2020　(FR) ...................................... 2011045

(51) Int. Cl.
*B23P 6/00*　　　(2006.01)
*B22F 5/00*　　　(2006.01)
(Continued)

(52) U.S. Cl.
CPC .............. *B23P 6/007* (2013.01); *B22F 5/009* (2013.01); *B22F 10/28* (2021.01); *B22F 10/30* (2021.01);
(Continued)

(58) Field of Classification Search
CPC ...... B23P 6/007; F05D 2230/80; B22F 5/009; F02K 1/827
See application file for complete search history.

(56) References Cited

U.S. PATENT DOCUMENTS 9,545,774 B1 *　1/2017　Heng ...................... B32B 18/00
2015/0275687 A1 *　10/2015　Bruck .................... B23P 6/007
　　　　　　　　　　　　　　　　　277/630
(Continued)

FOREIGN PATENT DOCUMENTS

EP　　　2930011 A1 *　10/2015
FR　　　3013634 A1　　5/2015
FR　　　3075690 A1 *　6/2019　............. B29C 73/10

OTHER PUBLICATIONS

Machine translation of FR-3075690-A1 (Year: 2019).*
(Continued)

*Primary Examiner* — Kyle A Cook
(74) *Attorney, Agent, or Firm* — WOMBLE BOND DICKINSON (US) LLP

(57)　　　ABSTRACT

A method for repairing a part for an aircraft turbine engine, the part including a lower panel, an upper panel and a core having a honeycomb structure arranged between the lower panel and the upper panel, the part having an unimpaired portion and an at least partially impaired portion, the repair method including the following steps: (a) removing at least one portion of the lower panel or the upper panel from an area to be repaired; (b) removing at least one portion of the core from the area to be repaired; (c) reforming the core in the area to be repaired directly on the part by additive manufacturing; (d) reforming the lower panel or the upper panel in the area to be repaired, directly on the part.

10 Claims, 6 Drawing Sheets

(51) Int. Cl.

| | |
|---|---|
| *B22F 10/28* | (2021.01) |
| *B22F 10/30* | (2021.01) |
| *B22F 10/85* | (2021.01) |
| *B29C 64/118* | (2017.01) |
| *B29C 64/393* | (2017.01) |
| *B33Y 10/00* | (2015.01) |
| *B33Y 50/02* | (2015.01) |
| *F02C 7/045* | (2006.01) |
| *F02K 1/82* | (2006.01) |
| *B29K 23/00* | (2006.01) |
| *B29K 63/00* | (2006.01) |
| *B29K 77/00* | (2006.01) |
| *B29K 307/04* | (2006.01) |
| *B29L 31/60* | (2006.01) |

(52) U.S. Cl.
CPC ............ *B22F 10/85* (2021.01); *B29C 64/118* (2017.08); *B29C 64/393* (2017.08); *B33Y 10/00* (2014.12); *B33Y 50/02* (2014.12); *F02C 7/045* (2013.01); *F02K 1/827* (2013.01); *B22F 2301/052* (2013.01); *B22F 2998/10* (2013.01); *B29K 2023/12* (2013.01); *B29K 2063/00* (2013.01); *B29K 2077/10* (2013.01); *B29K 2307/04* (2013.01); *B29L 2031/608* (2013.01); *F05D 2220/323* (2013.01); *F05D 2230/80* (2013.01); *F05D 2260/96* (2013.01)

(56) References Cited

U.S. PATENT DOCUMENTS

| | | | | |
|---|---|---|---|---|
| 2016/0263845 | A1 | 9/2016 | Delehouze et al. | |
| 2019/0160803 | A1* | 5/2019 | Evens | B29C 65/48 |
| 2019/0251943 | A1* | 8/2019 | Thomas | B32B 1/00 |
| 2020/0101690 | A1* | 4/2020 | Oishi | B64D 33/02 |
| 2020/0130264 | A1* | 4/2020 | Fukase | B22F 10/30 |
| 2021/0323222 | A1* | 10/2021 | Schädel | D01F 1/10 |

OTHER PUBLICATIONS

International Search Report and Written Opinion received for PCT Patent Application No. PCT/FR2021/051873, mailed on Jan. 24, 2022, 17 pages (8 pages of English Translation and 9 pages of Original Document).

\* cited by examiner

[Fig.1]
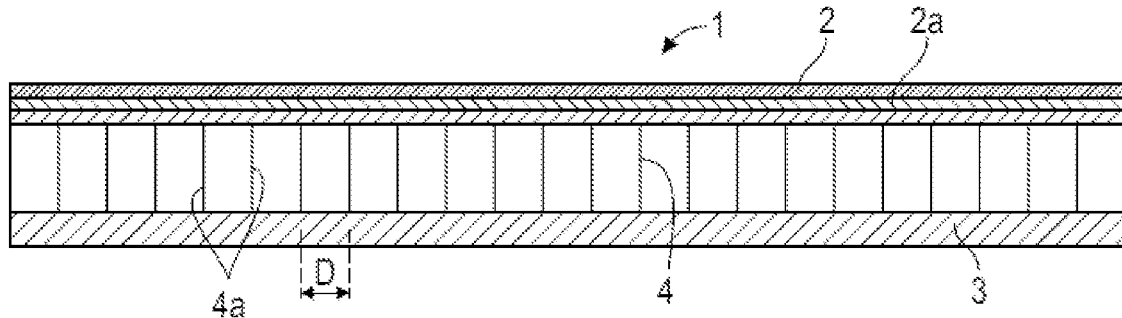
[Fig.2]
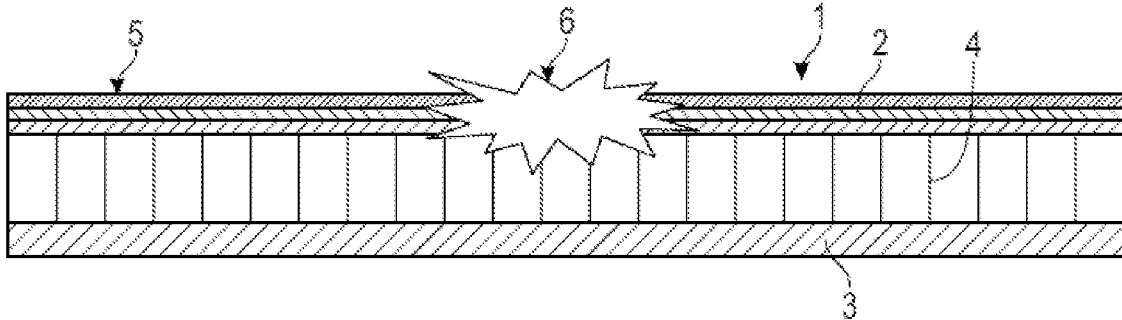

[Fig.3a]
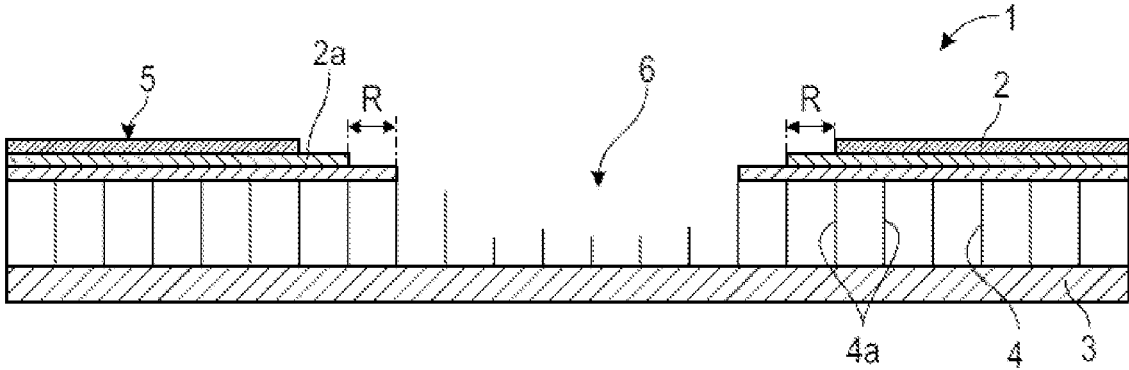
[Fig.3b]
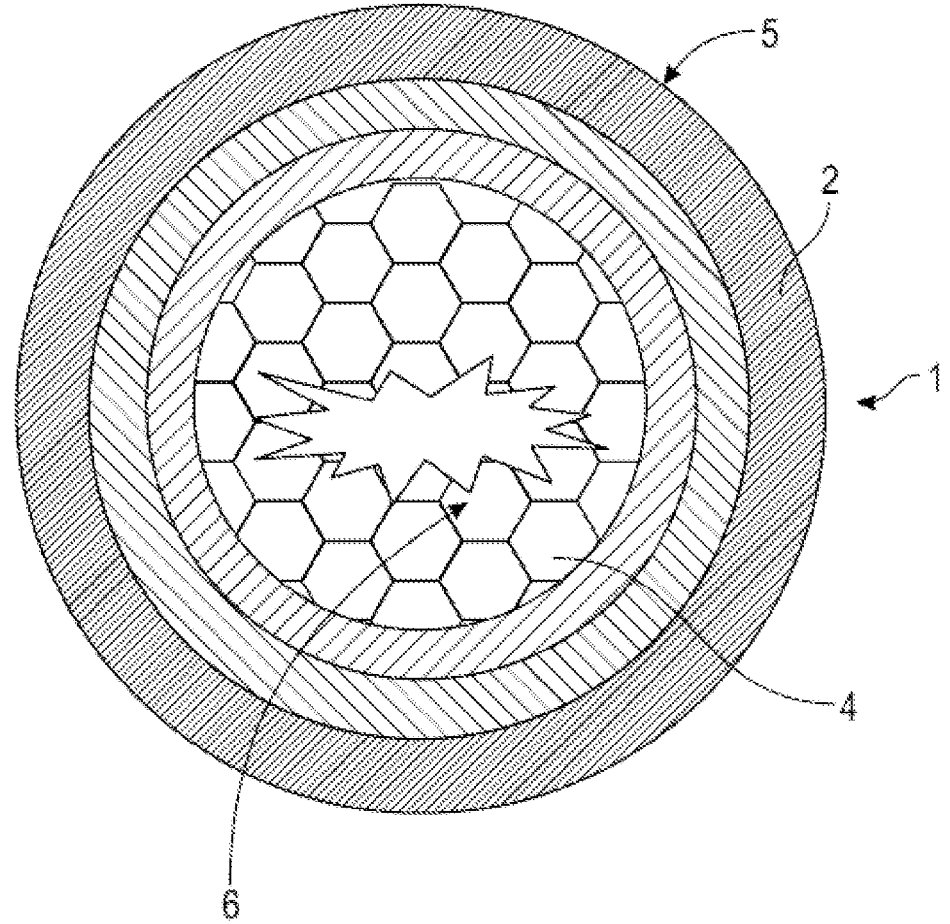

[Fig.4]
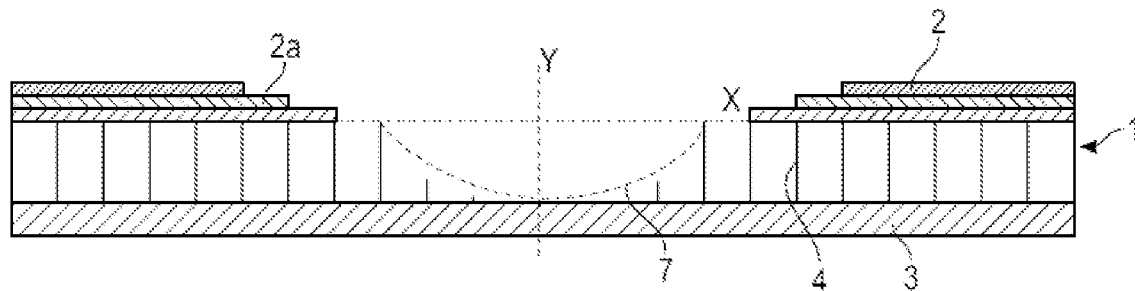

[Fig.5a]
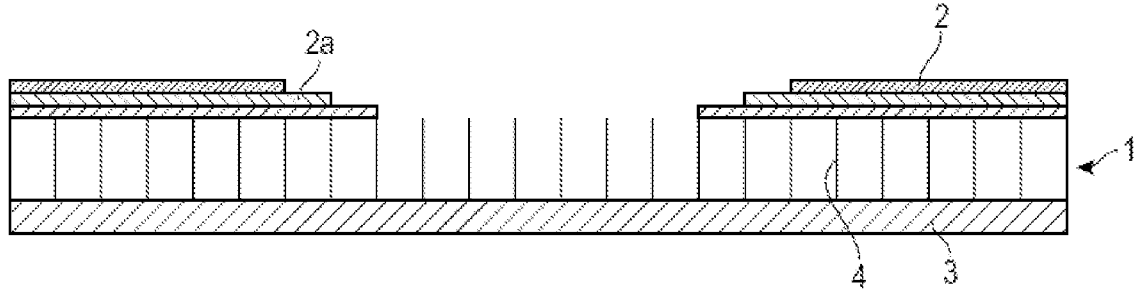
[Fig.5b]
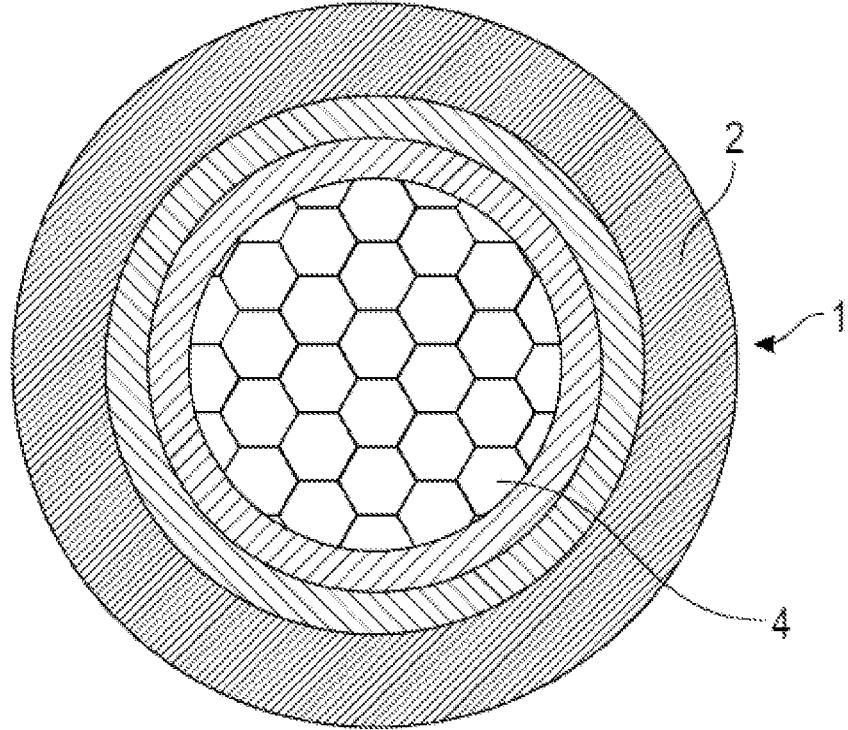

[Fig.6a]
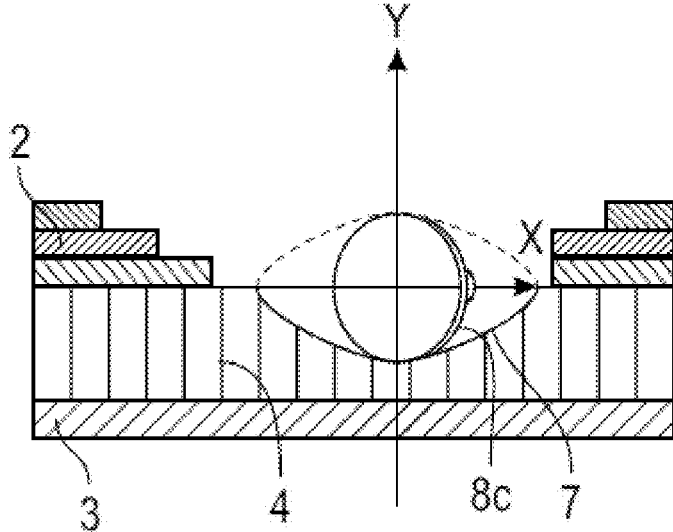
[Fig.6b]
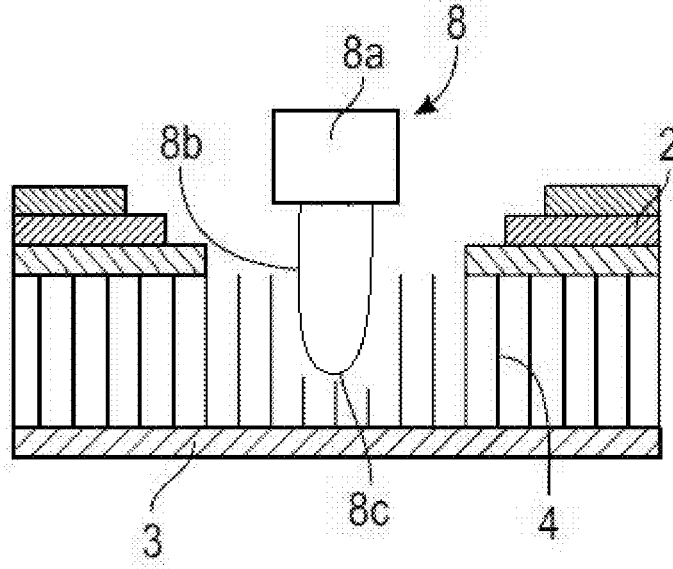

[Fig.7]
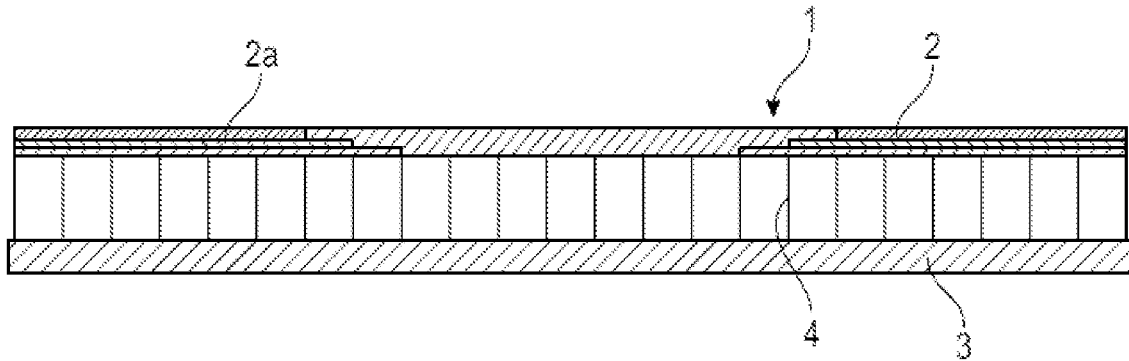

METHOD FOR REPAIRING A PART FOR AN AIRCRAFT TURBINE ENGINE

TECHNICAL FIELD OF THE INVENTION

The invention relates to the technical field of methods for repairing a part for an aircraft turbine engine, the part comprising a lower panel, an upper panel and a core having a honeycomb structure.

The invention falls within the general technical field of methods for repairing, by additive manufacturing, the parts for the aircraft turbine engine.

TECHNICAL BACKGROUND

The prior art is illustrated in the documents US-A1-2015275687 and EP-A1-2 930 011.

The parts made of composite materials are widely used in the aerospace industry due to their low mass and good mechanical performance compared to the parts made of metallic materials. The parts are used, for example, to equip the aircraft turbine engines.

The parts made of composite materials have a sandwich structure and typically comprise a lower panel, an upper panel and a core with a honeycomb structure arranged between the lower and upper panels. The upper panel and lower panel are typically made of an organic matrix composite material (known by the acronym OMC, for "organic matrix composite"). The composite material thus comprises an organic matrix formed from a polymeric material such as a thermoplastic or thermoset and reinforcing fibres embedded in the matrix such as carbon fibres. The core is usually made of a metallic material and helps to increase the mechanical strength of the part against the stresses applied to the part during the operation of the turbine engine while ensuring a low weight.

The thermosetting polymeric material matrix is generally preferred for the manufacture of parts intended for a turbine engine. However, the cost of such a material is high and the environmental impact significant. Thus, there is a need to ensure the durability of parts formed from a composite material with a matrix of thermosetting polymeric material.

In operation, the part may be impaired in its thickness and may thus show impairment both in the lower and/or upper panel and in the core. It is preferable to repair the impaired part rather than replace it entirely with an unimpaired part in order to make the manufacturing cost of the part profitable and to minimise its environmental impact.

A manufacturing method is known in which a resin is placed between the upper and lower panel in place of the impaired core. The resin thus maintains the mechanical functions and dimensional characteristics of the part. However, the part is not restored because a portion of the core no longer has the honeycomb structure. Also, the presence of the resin makes the part heavier. Finally, the resin creates heterogeneities in the structure of the part, forming points of mechanical weakness.

Furthermore, a repair method is also known in which the core of the impaired part is first removed. Then a replacement member is provided by additive manufacturing. The replacement member is then arranged in the part, in place of the impaired portion of the core to restore the part. The replacement member is attached to the part via connecting elements. Such a method is for example illustrated in the document FR-A1-3 075 690.

The disadvantage of such a method is that it introduces connecting elements which are not present in the original part. This makes the part heavier and more complex. Also, it is necessary to provide a replacement member with exactly the same structure as the removed core, which makes the repair method very complex. The arrangement of the replacement member in the part also requires a great deal of dexterity on the part of the operators. Such an operation is tedious, which makes the repair method long and expensive.

In this context, there is a need to provide a repair method which is simple to implement and which allows the restoration of a part, wherein the lower and/or upper panel and core having a honeycomb structure, are impaired, while preserving its structure and its mechanical properties.

SUMMARY OF THE INVENTION

To this end, the invention proposes a method for repairing a part for an aircraft turbine engine, the part comprising a lower panel, an upper panel and a core having a honeycomb structure arranged between the lower panel and the upper panel, the part comprising an unimpaired portion and an at least partially impaired portion, the repair method comprising the following steps of:

(a) removing at least one portion of the lower panel or upper panel from an area to be repaired;

(b) removing at least one portion of the core from the area to be repaired;

(c) reforming the core in the area to be repaired directly on the part by additive manufacturing;

(d) reforming the lower panel or upper panel in the area to be repaired directly on the part.

The repair method according to the invention allows to reform the core and the lower and/or upper panel directly on the part. The additive manufacturing allows the honeycomb structure forming the core to be restored to be printed identically, directly on the part. Therefore, the part does not include any additional fastening elements since the core and the upper and/or lower panel are directly manufactured on the part. The method also eliminates the time-consuming step of arranging a replacement member in the part and connecting this member to the part. Also, the repaired part is not weighed down. The structural and mechanical properties of the part are also preserved.

The method according to the invention may comprise one or more of the following characteristics, taken alone or in combination with each other:

the step (c) comprises the following substeps of:

(c1) providing a digital model comprising spatial coordinates of the unimpaired portion of the core;

(c2) supplying a first repair material to an additive manufacturing device, said device comprising a nozzle;

(c3) depositing the first repair material according to the spatial coordinates acquired in the step (c1) to reform the core, the core is made of a material identical to the first repair material, the first repair material is selected from the metallic materials such as aluminium, the lower panel and/or the upper panel comprises a plurality of plies, the step (b) of removing at least one portion of the core is carried out according to a profile in a cross-section of the part in the form of an ellipse, the ellipse having a minor axis and a major axis, the nozzle is cylindrical and the ellipse has a height measured along the minor axis greater than or equal to the radius of the nozzle, the ellipse has a width measured along the major axis greater than or equal to twice the radius of the nozzle, the honeycomb structure has a plurality of cells, the cells being separated by a distance D, the nozzle having a diameter greater than or equal to twice the distance D, the lower panel and the upper panel are made of a composite material.

BRIEF DESCRIPTION OF THE FIGURES

Further characteristics and advantages will be apparent from the following description of a non-limiting embodiment of the invention with reference to the appended drawings in which:

FIG. 1 is a cross-sectional view of an example of a part;

FIG. 2 is a cross-sectional view of the part in FIG. 1 to be repaired;

FIG. 3a is a cross-sectional view of the part of FIG. 2 in a first step of the method according to the invention;

FIG. 3b is a top view of FIG. 2;

FIG. 4 is a cross-sectional view of the part of FIG. 2 in a second step of the method according to the invention;

FIG. 5a is a cross-sectional view of the part of FIG. 2 in a third step of the method according to the invention;

FIG. 5b is a top view of FIG. 5a;

FIG. 6a is a cross-sectional view of the part of FIG. 2 in a third step of the method according to a first example;

FIG. 6b is a cross-sectional view of the part of FIG. 2 in a third step of the method according to a second example;

FIG. 7 is a cross-sectional view of the part of FIG. 2 in a fourth step of the method according to the invention.

DETAILED DESCRIPTION OF THE INVENTION

FIG. 1 shows a cross-sectional example of a part 1 according to the invention. The part 1 is intended to equip an aircraft turbine engine. The part 1 is for example an acoustic panel.

The part 1 comprises an upper panel 2, a lower panel 3 and a core 4 arranged between the upper panel 2 and the lower panel 3.

The upper panel 2 and the lower panel 3 have a thickness of between 0.1 mm and 15 mm respectively. The upper panel 2 and/or the lower panel 3 are made of a composite material. The upper panel 2 and/or the lower panel 3 comprise for example a plurality of plies 2a, for example between 2 and 15 plies. The plies 2a represent formed layers of the composite material. In the example shown in FIG. 1, the lower panel 3 comprises a single ply 2a.

The composite material comprises an organic matrix and reinforcing fibres embedded in the matrix. For example, the matrix is made of a thermoplastic or thermosetting polymeric material. The thermosetting polymeric material is for example an epoxy resin. The reinforcing fibres are for example carbon fibres.

The core 4 is arranged between the upper panel 2 and the lower panel 3. The core 4 has a thickness greater than the thickness of the upper panel 2 and the thickness of the lower panel 3. The thickness of the core 4 is for example between 5 mm and 20 mm. The core 4 has a honeycomb structure. The honeycomb structure is made of a material selected from metallic materials such as aluminium. According to another example of embodiment, the honeycomb structure is formed from a material selected from polymeric materials such as polypropylene or aromatic polyamides. The honeycomb structure has a plurality of cells 4a. The cells 4a have a tubular shape with a hexagonal cross-section for example. The cells 4a are separated by a distance D of between 1 mm and 20 mm.

In operation, the part 1 is subject to high forces and friction with other parts of the turbine engine, for example. This force or friction can lead to impairment of the part 1 which must be repaired to make the part 1 operational again.

Thus, as can be seen in FIG. 2, the part 1 comprises an unimpaired portion 5 and an at least partially impaired portion 6. The at least partially impaired portion 6 forms an area to be repaired. The at least partially impaired portion 6 extends, in the example of FIG. 2, from the upper panel 2 to a portion of the thickness of the core 4. According to another example not shown, the at least partially impaired portion 6 extends from the lower panel 3 to a part of the thickness of the core or from the upper panel 2 to the lower panel 3 thus passing through the entire thickness of the core 4.

The part 1 is repaired according to a repair method that will now be described on the basis of FIGS. 3a to 7.

As shown in FIGS. 3a and 3b, the repair method according to the invention comprises a first step (a) of removing at least one portion of the lower panel 3 or the upper panel 2 from the area to be repaired. The step (a) is for example carried out by machining the lower panel 3 or the upper panel 2. Thus, as best seen in the example in FIG. 3b, the core 4 is devoid of the upper panel 2 in the area to be repaired. The removal is achieved by removing at least one portion of each ply 2a. The removal of each ply 2a is done in an impaired manner, i.e., there is a removal R between each ply 2a.

In a second step (b) of the method, shown for example in FIG. 4, at least one portion of the core 4 is removed from the area to be repaired. The removal of the core 4 in step (b) is for example achieved by machining the honeycomb structure. Advantageously, the step (b) of removing at least one portion of the core 4 is carried out according to a profile according to the cross-section of the part in the form of an ellipse 7, the ellipse 7 having a small axis Y and a large axis X. The step (b) of removing the core 4 allows the initial size of a cell 4a to be known and to ensure the final verification of the repair.

At the end of steps (a) and (b) of the method, the part 1 has the area to be repaired free of the lower panel 3 or upper panel 2 and at least one portion of the core 4 and an unimpaired portion 5 surrounding the area to be repaired. The unimpaired portion 5 comprises the lower panel 3, the upper panel 2 and the core 4 between the lower panel 3 and the upper panel 2.

Then, according to a third step (c) of the method shown as an example in Figure the core 4 is reformed in the area to be repaired directly on the part 1 by additive manufacturing. The additive manufacturing method is, for example, a concentrated energy deposition method known by the acronym DED for "Direct Energy Deposition", in particular when the core 4 is metallic. According to another example, the additive manufacturing method is a fused deposition modelling (FDM) method, in particular when the core 4 is polymeric.

Advantageously, the step (c) comprises a sub-step (c1) of providing a digital model comprising spatial coordinates of the unimpaired portion 5 of the core 4. The step (c) further comprises a substep (c2) of supplying a first repair material to an additive manufacturing device 8.

The additive manufacturing device 8 is for example shown in FIGS. 6a and 6b. It comprises a nozzle 8c and for example a motor 8a and a heating head 8b. The nozzle 8c is for example mounted on the heating head 8b. The nozzle 8c is for example cylindrical or conical.

According to a first example of embodiment shown in FIG. 6*a*, the ellipse 7 according to which the removal was carried out has a height measured along the minor axis Y greater than or equal to the radius of the nozzle 8*c*. Advantageously, the ellipse 7 has a width measured along the major axis X greater than or equal to twice the radius of the nozzle 8*c*.

According to a second example of embodiment shown in FIG. 6*b* in which the nozzle 8*c* is offset with respect to the motor 8*a*, the nozzle 8*c* has a diameter greater than or equal to twice the distance D separating the cells 4*a*.

Advantageously, the first repair material is identical to the material forming the core 4. This improves the bond strength between the core 4 of the unimpaired portion and the repaired core 4. Thus, the first repair material is for example made of a metallic material such as aluminium.

Next, a sub-step (c3) is performed in which the first repair material is deposited on the part 1 according to the spatial coordinates acquired in the step (c1) to reform the core 4. Thus, as shown in FIGS. 5*a* and 5*b*, the core 4 is restored.

The method according to the invention then comprises a step (d) of reforming the lower panel 3 or the upper panel 2 in the area to be repaired directly on the part 1. The step (d) advantageously comprises a sub-step (d1) of reforming a first ply 2*a*. The sub-step (d1) is repeated according to the number of plies 2*a* forming the lower panel 3 or upper panel 2. As the removal of the plies 2*a* during the step (a) was carried out in an impaired manner, the mechanical strength of the part 1 is improved.

FIG. 7 shows an example where the upper panel 2 is reformed.

In this way, the invention allows to restore the part 1 in its entirety without adding connecting parts that make the part 1 heavier and more complex. Also, the mechanical properties of the part 1 are preserved since the complete structure of the part 1 is restored.

The invention claimed is:

1. A method for repairing a part for an aircraft turbine engine, the part comprising a lower panel, an upper panel, and a core having a honeycomb structure arranged between the lower panel and the upper panel, the part comprising an unimpaired portion and an at least partially impaired portion, the repair method comprising the following steps of:

wherein the lower panel and the upper panel comprises a plurality of plies, wherein in step (a), each ply of the upper or lower panel is removed forming a longitudinal gap between an end of a lower ply and an end of an upper ply such that the lower ply is longer than the upper ply, and wherein the end of the lower ply and the end of the upper ply have straight edges, and wherein in step (d) each of the plurality of plies of the lower panel or the upper panel are individually reformed by manufacturing directly on the part.

2. The method according to claim 1, wherein the lower panel and the upper panel are made of a composite material.

3. The method according to claim 1, wherein the step (c) comprises the following substeps of:

(c1) providing a digital model comprising spatial coordinates of the unimpaired portion of the core;

(c2) supplying a first repair material to an additive manufacturing device, this device comprises a nozzle; and (c3) depositing the first repair material according to the spatial coordinates acquired in step (c1) to reform the core.

4. The method according to claim 3, wherein the core is formed of a material identical to the first repair material.

5. The method according to claim 3, wherein the first repair material is selected from metallic materials.

6. The method according to claim 3, wherein the honeycomb structure has a plurality of cells, the cells being separated by a distance D, the nozzle having a diameter greater than or equal to twice the distance D.

7. The method according to claim 3, wherein the first repair material is an aluminum.

8. The method according to claim 3, wherein the step (b) of removing at least one portion of the core is carried out according to a profile in a cross-section of the part in the form of an ellipse, the ellipse having a minor axis (Y) and a major axis (X).

9. The method according to claim 8, wherein the nozzle is cylindrical and in that the ellipse has a height measured along the minor axis (Y) greater than or equal to the radius of the nozzle.

10. The method according to claim 9, wherein the ellipse has a width measured along the major axis (X) greater than or equal to twice the radius of the nozzle.

* * * * *